United States Patent [19]

Nighan et al.

[11] 4,348,647
[45] Sep. 7, 1982

[54] STABILITY ENHANCED RARE-GAS MONOFLUORIDE LASERS

[75] Inventors: William L. Nighan; Robert T. Brown, both of Manchester, Conn.

[73] Assignee: United Technologies Corporation, Hartford, Conn.

[21] Appl. No.: 156,547

[22] Filed: Jun. 5, 1980

[51] Int. Cl.³ .............................. H01S 3/22; H01S 3/97
[52] U.S. Cl. ........................................ 372/74; 372/57
[58] Field of Search ................. 331/94.5 G, 94.5 PE, 331/94.5 S

[56] References Cited

U.S. PATENT DOCUMENTS 4,238,742 12/1980 Champagne .................... 331/94.5 G

OTHER PUBLICATIONS

Brown et al., "Instability Onset in Electron-Beam-Sustained KrF* Laser Discharges", App. Phys. Lett. 32 (11), Jun. 1, 1978, pp. 730-733.
Nighan, "Plasma Processes in Electron-Beam Controlled Rare-Gas Halide Lasers", IEEE J. of Quantum Electronics, vol. QE-14, No. 10, Oct. 1978, pp. 714-726.

Primary Examiner—James W. Davie
Attorney, Agent, or Firm—M. P. Williams

[57] ABSTRACT

The onset of electric discharge instability in rare-gas monofluoride lasers pumped by electron beam sustained electric discharges (e.g., KrF*) is delayed by employing a laser gas mixture (such as 0.95 Ar, 0.05 Kr, and 0.005 $F_2$) which includes a small amount of a halogen compound ($NF_3$) having a rate coefficient for electron dissociative attachment which is much larger than that for fluorine (such as 0.0005 $NF_3$). The addition of nitrogen trifluoride to the gas mixture modifies the halogen kinetics in a manner to reduce the effect that consumption of the fluorine fuel has on the growth of secondary electrons, and therefore the occurrence of instability in the discharge. The rare-gas metastable quenching coefficient for the nitrogen trifluoride is sufficiently small (on the order of six times smaller than that of the fluorine) so that the small amount of nitrogen trifluoride utilized to stabilize the discharge exerts little or no influence on the other laser processes.

1 Claim, 2 Drawing Figures

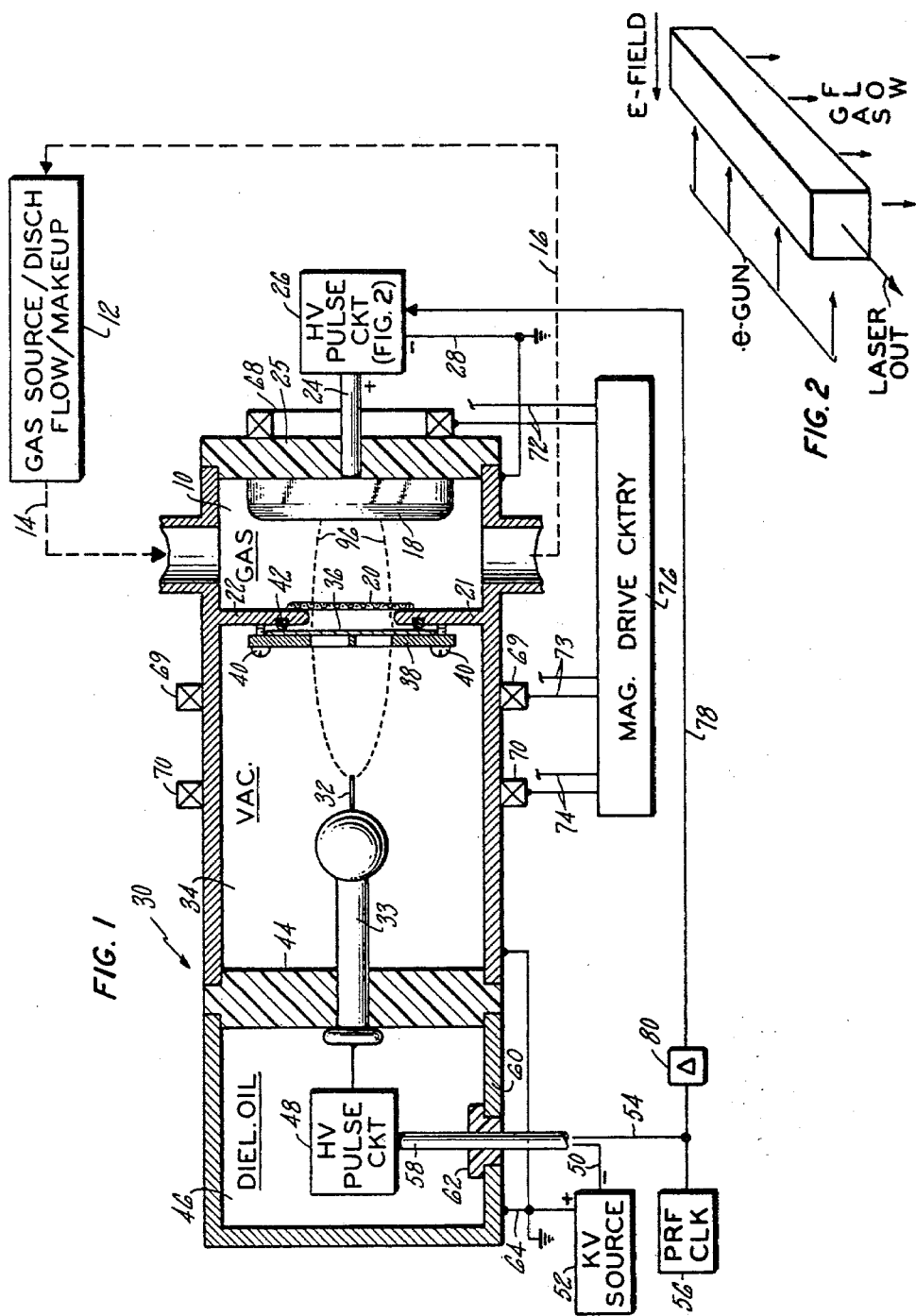

STABILITY ENHANCED RARE-GAS MONOFLUORIDE LASERS

The Government has rights in this invention pursuant to Contract No. N00014-76-C-0847 awarded by the Department of the Navy.

DESCRIPTION

Technical Field

This invention relates to rare-gas monofluoride lasers, and more particularly to enhancing the stability of the electric discharge used to excite such lasers by means of a two-component halogen mixture which favorably alters the halogen kinetics.

Background Art

In many applications, efficient laser sources having output wavelengths in the ultraviolet/visible region of the electromagnetic spectrum are required. Therefore, attention has been directed to the potential of rare-gas monohalides as laser molecules. Much work has been directed to the krypton monofluoride laser, which is the most efficient of the halide laser class.

Such lasers depend on electron collisional processes for excitation of the molecule into the upper laser level. Therefore, the lasers can be pumped either by electron guns or by electric discharges. Because the overall processes result in temperature increases on the order of 100° C. per microsecond, and halogen fuel consumption can be on the order of 20%–50% per microsecond, only pulsed operation, of about several microseconds duration, is possible. In order to provide for scalability to large volumes and long pulse lengths (e.g., 1 microsecond) while limiting the burden of the electron beam technology required, the rare-gas monohalide lasers have typically been pumped by means of electron beam sustained electric discharges.

As described in Brown, R. T. and Nighan, W. L., "Instability Onset in Electron-Beam-Sustained KrF* Laser Discharges", Applied Physics Letters 32(11), June 1978, pp. 730–733, the limitation on such electron beam sustained discharges is due to a premature onset of instability (localized arcing), which substantially shorts the electric field, reducing the field below a useful value. This is described in Brown et al as a manifestation of temporal amplification of electron density disturbances (ionization instability). In Brown et al it is shown that significant reduction in the ratio of electric field to neutral particle density in the electric discharge (E/n), from calculated values determined to be proper for the desired excitation of the lasing species, to lower values that result in stable discharges of longer duration, results in the small signal gain (laser intensity amplification factor) being concomitantly reduced so that there is little if any net improvement in laser output.

A detailed description of numerous characteristics of the processes involved in rare-gas monohalide lasers, which leads to the conclusion that the inherent difficulty of maintaining desired plasma properties in a stable discharge over the temporal extent of a sufficiently long pulse (on the order of a microsecond) is as a consequence of significant changes in the gas mixture arising from the halide lasing species formation process itself, is presented in Nighan, W. L., "Plasma Processes in Electron-Beam Controlled Rare-Gas Halide Lasers", IEEE Journal of Quantum Electronics, Volume QE-14, October 1978, pp. 714–726.

Therefore, although various halide lasers have been shown to have a theoretical capability of useful production of ultraviolet and/or visible laser pulses, scalable into the tens of kilowatt regime, with acceptable efficiencies of on the order of 1% or greater, the practical implementation thereof has been impeded by the inability to maintain stable discharge conditions to acquire a pulse of an adequate duration, with a sufficient laser intensity amplification factor, to render such lasers practical for use.

Disclosure of Invention

Objects of the invention include stabilizing discharges in electron beam sustained, electric discharge rare-gas monofluoride lasers.

According to the present invention, the onset of instability in the electric discharge of an electron beam sustained electric discharge rare-gas monofluoride laser is delayed by modification of the halogen kinetics in a manner that the loss of halogen fuel has a less severe effect on the occurrence of discharge instability. In further accord with the present invention, a rare-gas monofluoride laser employs a gas mixture including nitrogen trifluoride which has a rate coefficient for electron dissociative attachment which is approximately four times larger than that of the fluorine fuel, and a rate coefficient of rare-gas metastable atom quenching which is approximately six times smaller than that of the fluorine fuel. In still further accord with the present invention, the nitrogen trifluoride is provided in the laser gas mixture in an amount that is on the order of one-tenth of the amount of fluorine fuel.

The present invention provides a relatively low cost method of delaying the onset of discharge instability in rare-gas monofluoride lasers. The invention may be used alone, or in combination with one or more electronic methods of delaying the onset of discharge instability, such as those disclosed and claimed in our commonly owned, copending application Ser. No. 132,018 filed on Mar. 20, 1980 and entitled STABILITY ENHANCED HALIDE LASERS.

In the light of the teachings herein, the invention may be practiced utilizing apparatus and techniques which are well within the skill of the art.

The foregoing and other objects, features and advantages of the present invention will become more apparent in the light of the following detailed description of exemplary embodiments thereof, as illustrated in the accompanying drawings.

BRIEF DESCRIPTION OF DRAWINGS

FIG. 1 is a simplified schematic diagram of an electron beam sustained electric discharge, flowing, pulsed rare-gas monohalide laser incorporating the present invention; and FIG. 2 is a simplified illustration of a laser configuration.

BEST MODE FOR CARRYING OUT THE INVENTION

Referring now to FIG. 1, exemplary laser apparatus incorporates a laser cavity (not shown) disposed within a chamber 10 in which the chemical and electrical processes relating to the invention take place. As illustrated in FIG. 2, the laser gain path (such as between conventional confocal, or other mirrors forming an optical oscillator) is perpendicular both to the electric field and the gas flow in the apparatus of FIG. 1. Thus, in FIG. 1, the laser gain path is perpendicular to the plane of the drawing. In a typical high power laser in which the present invention may be practiced, the laser cavity (that is, the dimension perpendicular to the sheet as seen in FIG. 1) may be on the order of one meter long, and both the height of the chamber (as seen in FIG. 1) and the distance between the cathode and the anode may be on the order of several centimeters or more.

Gas control apparatus 12 is connected by suitable conduits 14, 16 to the chamber 10 and provides a suitable gas mixture, such as 0.95 argon, 0.05 krypton, and 0.005 fluorine. Other gas mixtures may be used, such as different mixture fractions of argon, krypton, fluorine and nitrogen trifluoride, or such as may be appropriate for other rare-gas halide lasers (e.g., XeF*, using neon, xenon, nitrogen trifluoride mixtures). The gas system may be open cycle, providing gas flow from tanks and causing the exit gas to pass through a scavenger system (or to atmosphere) or, may be a closed cycle system including a circulation pump; and perhaps a slight bleed with a makeup gas inlet may be employed. Or a static (no flow) sealed system may be used for single pulse (very low PRF) operation. All of this is within the skill of the art and forms no part of the present invention.

The electric field is provided within the chamber 10 between an anode 18 and a cathode 20. The cathode 20 can vary in its configuration, but may comprise a screen of orthogonal mesh, with twenty, 12-mil wires per inch, or the like. The cathode 20 may be secured to walls 21, 22 of the chamber 10 with a heavy collar (not shown) or by spot welding, since it needs only a limited amount of mechanical stability and electrical contact with the walls of the chamber 10, which are electrical ground.

The anode 18 is provided with a suitable connection 24, within a suitable insulator or insulating wall 25, to the positive output of a high voltage pulse circuit 26, the negative output of which is grounded to the wall 21 of the chamber 10. This establishes an electric field gradient from the anode 18 to the cathode 20, in the well known fashion.

To provide primary electrons to the process, an electron beam gun 30 includes a thin foil cathode 32, disposed in a vacuum and supported by a low field concentration metallic structure 33. The cathode is disposed in a vacuum chamber 34, which may be evacuated to $10^{-5}$ Torr, or so. The electrons are accelerated toward a thin foil window 36 which separates the vacuum chamber 34 from the atmospheric pressure of the lasing chamber 10. The window 36 may comprise a foil of titanium, stainless steel, aluminum, or the like, and may be on the order of 1 mil thick. The foil window may be on the order of $10 \times 100$ centimeters. Support for the foil is provided by a much thicker grate-like structure 38, which may resemble a hibachi grill grating, that is fastened in a suitable way, such as by screws or bolts 40, to the walls 21, 22 of the chamber 10. An O-ring 42 may be provided to ensure a gas-tight seal between the foil window 36 and the walls 21, 22. Thus, the foil is electrically grounded, along with the walls of the chambers 34, 10 and therefore represents the anode of the electron gun.

The electron gun cathode structure 33 is mounted by means of suitable insulator 44 through the wall of a dielectric oil chamber 46, within which high voltage pulse circuitry 48 is disposed. The dielectric oil avoids arcing and corona effects which might otherwise attend the high voltage pulse circuitry 48, since this circuitry may typically operate at several hundred kilovolts. Suitable connections, such as a negative voltage line 50 from a high voltage source 52 and a trigger pulse line 54 from a pulse repetition frequency clock 56, may be made through a conduit 58 that is isolated from the wall 60 of the chamber 46 by means of a suitable insulator 62. The walls 21, 22 and 60 are all at the same ground potential, due to connections 64. The positive side of the kilovolt source 52 is also connected to ground. The electron beam gun 30 comprises a cold cathode gun operative in a space-charge-limited mode. For stable discharges having a high electric field to neutral particle density ratio, current densities in the range of 0.5–2.0 amps per square centimeter are typical. When operating in such a current density regime, it can be shown (to at least a first order approximation) that the current density is dependent upon the three-half power of the cathode driving voltage. Therefore, it can also be shown that current densities can be varied from 0.7 amps per square centimeter to 1.5 amps per square centimeter, as the cathode voltage is varied from 200 KeV to 400 KeV.

In the embodiment of FIG. 1, three, single-turn magnetic coils 68–70 are connected, by respective suitable connections 72–74, to magnetic driving circuitry 76, which provides suitable current to the coils 68-70 to focus, or as described more fully in our aforementioned copending application, to defocus the electron beam. In this example, the coils may comprise single turns of heavy wire, on the order of two cm diameter, and the current in the various coils may be constant, or programmed in accordance with the invention of the aforementioned copending application, with magnitudes on the order of 5,000 amps to 30,000 amps. In some instances, no magnetic fields may be required at all, and in other instances only a single coil may be required (such as the coil 68) in order to provide desired focusing, in dependence upon the particular configuration in which the invention may be practiced.

The magnetic driving circuitry 76 as well as the high voltage pulse circuit 26 may be connected to a delayed pulse repetition frequency clock signal line 78 which is connected through a delay circuit 80 to the pulse repetition frequency clock 56. The delay circuit 80 may cause the electric field 26 to be established a short time (on the order of 70 nanoseconds) after activation of the electron gun 30, so as to conserve energy until maximum current density output of the electron gun is achieved. On the other hand, such a delay need not be used if not deemed desirable in any implementation of the present invention. Similarly, if desired, the high voltage pulse circuit 26 could be arranged, with respect to the pulse repetition frequency clock 56, so as to shut off a short time (such as on the order of 250 nanoseconds) before deactivation of the electron beam, similarly to conserve energy. But, as seen in FIG. 1, this option is not included, since it is not essential in a laser employing the invention.

For a better understanding of the present invention, in the light of the exemplary embodiments described here, a brief summary of some of the processes, and the consequences thereof, involved in electron beam sustained electric discharge rare-gas monohalide lasers, is useful. The following discussion is best understood with appropriate reference to the Table of Nomenclature, Table of Processes, and Table of Equations, hereinafter.

The invention is described using KrF* lasing species, with Ar buffer gas, as an example.

The electron beam sustained electric discharge rare-gas monofluoride laser includes a variety of processes in order to provide laser pulses with a sufficient laser intensity amplification factor. Typically, an electron beam is established, following which an electric field is created. Typically, on the order of fifty to one hundred nanoseconds may be provided in order for maximum current density of the electron beam gun output to be achieved prior to establishing the electric field, in order to minimize power utilization. In a laser known to the art (to which the improvement of the invention may be added), a suitable gas mixture, such as 0.95 argon, 0.05 krypton, and 0.005 fluorine (in fractional number density per unit volume), is present in the laser cavity across which the electric field is established and into which the electron beam is deposed. The high energy, primary electrons from the electron beam source collide with all of the molecules in the mixture, creating secondary electrons. Since the kinetics of the electron-fluorine collisions are not productive of significant numbers of electrons, the creation of secondary electrons by means of collision with primary electrons is substantially limited to argon and krypton, as set forth in processes 1 and 2 hereinafter. The electric field accelerates the secondary electrons, and is designed to provide, for the kinetics involved, secondary electrons of an energy level which are, on average, highly productive of krypton atoms excited to the first electronic energy state (process 3, hereinafter). The excited krypton atoms collide with the fluorine molecules to produce excited krypton monofluoride molecules and fluorine atoms (process 4, hereinafter); the excited krypton monofluoride first electron energy state is an upper laser level, so that the excited molecule radiates (providing useful laser output energy) and reduces to the ground state. The ground state krypton monofluoride is repulsive, and the atoms dissociate, being unable to survive in the ground state. In a similar fashion, suitably energized secondary electrons also collide with ground state argon atoms to provide argon atoms excited to the first electronic energy state thereof (process 5, hereinafter) which in turn collide with fluorine molecules to provide argon monofluoride in a first electronic state and fluorine atoms (process 6, hereinafter). The excited argon monofluoride molecules collide with ground state krypton atoms to form excited krypton monofluoride molecules and ground state argon atoms in an exchange collisional process (process 7, hereinafter). Thus, the lasing species (excited krypton monofluoride) is created directly through the generation of krypton metastables, and less directly through the creation of argon metastables.

As the process proceeds, the population of the fluorine fuel molecules is depleted because the reassociation of the ground state fluorine atoms into molecules, at densities useful in the processes herein, is much slower than the other, related processes. As a consequence, the population of rare-gas metastables (the excited argon and krypton) continue to increase across the temporal extent of the laser pulse generation. Some of the secondary electrons (and of course the relatively few, by comparison, primary electrons), colliding with the rare-gas metastables, excite these atoms sufficiently for electron production, creating further secondary electrons (processes 8 and 9, hereinafter). This sequence of processes generally leads to a condition for which there occurs an amplification of electron density disturbances which can be locally significant at different regions of the electric discharge, and can increase the local current density to an extent where short circuiting of the electric field occurs, thereby reducing the electric field to an ineffective value, terminating the laser pulse generation process in its entirety.

The only process which has any significance in the consumption of secondary electrons is the electron dissociative attachment of secondary electrons with fluorine molecules (process 10, hereinafter) which forms fluorine ions and fluorine atoms. Since the fluorine molecules available for this process are in competition with those being utilized to form the lasing species, the consumption of fluorine molecule fuel has a multi-ordered dependence upon the time expended in the process. Thus, as fluorine molecules become less available, there is an increased number of rare-gas metastables to provide secondary electrons, and a decreased number of fluorine molecules to consume secondary electrons by means of electron dissociative attachment. Thus, at any given spot within the electric discharge, the instability of the discharge is inherent, being only a function of the time required for the local electron density disturbances to become amplified (that is, for processes 1, 2, 8 and 9 to dominate process 10).

An approximate qualitative analysis of these interprocess relationships can be made, considering that electric field stability is maintainable principally when the ionization of metastables is at a rate which is less than the rate of electron dissociative attachment to the fluorine particles. This is approximately represented by Equation A, hereinafter, wherein the factor 2 in the left side of the relationship arises because the metastable concentration varies as the square of the electron density, as is described more fully in the aforementioned Nighan article. This also can be expressed by the requirement that the ratio of metastable ion electron production to electron dissociative attachment must be less than one (Equation B, hereinafter). The factors involved in relationship B can be examined by considering requirements of electron conversion and metastable conservation, broadly, across the entire volume of the electric discharge (in contrast with local disturbances, which cause the onset of localized amplification or avalanching instability).

TABLE of Nomenclature $Ar$ = argon (ground state)
$Ar^*$ = metastable argon (first electronic energy state)
$Ar^+$ = argon ion
$ArF^*$ = argon monofluoride (first electronic energy state)
$e_p$ = primary electrons (from electron gun)
$e_s$ = secondary electrons
$F_2$ = fluorine molecule (ground state)
$F$ = dissociated fluorine atom (ground state)
$F^-$ = fluorine ion
$Kr$ = krypton (ground state)
$Kr^*$ = metastable krypton (first electronic energy state)
$Kr^+$ = krypton ion
$KrF^*$ = lasing specie, krypton monofluoride, (first electronic energy state, uppper lasing level)
$k^*$ = rate coefficient for production of rare gas metastables, Procs. (3) and (5)
$k_i^*$ = rate coefficient of ionization of rare gas metastables, Procs. (8) and (9)
$k_i$ = rate of ionization of all molecule by primary electrons, Procs. (1) and (2)
$k_F^-$ = rate coefficient of electron dissociative attachment in $F_2$, Proc. (10)
$k_N^-$ = rate coefficient of electron dissociative attachment in $NF_3$, Proc. (11)
$k_Q$ = rate coefficient of formation of excited rare gas

TABLE of Nomenclature-continued halogen, Procs. (4) and (6)
$k_Q^N$ = rate coefficient of metastable quenching by $NF_3$, Procs. (12) and (13)
$NF_3$ = nitrogen trifluoride additive of the invention
$NF_2$ = nitrogen difluoride (not significant in processes)
n = number density of all molecules
n* = number density of rare gas molecules, Ar*, Kr*
$n_F$ = number density of fluorine molecule, $F_2$
$n_s$ = number density of secondary electrons, $e_s$
$n_N$ = number density of nitrogen trifluoride, $NF_3$.

Table of Processes

1. $e_p + Ar \rightarrow Ar^+ + e_p + e_s$
2. $e_p + Kr \rightarrow Kr^+ + e_p + e_s$
3. $e_s + Kr \rightarrow Kr^* + e_s$
4. $Kr^* + F_2 \rightarrow KrF^* + F$
5. $e_s + Ar \rightarrow Ar^* + e_s$
6. $Ar^* + F_2 \rightarrow ArF^* + F$
7. $ArF^* + Kr \rightarrow KrF^* + Ar$
8. $e_s + Ar^* \rightarrow Ar^+ + e_s + e_s$
9. $e_s + Kr^* \rightarrow Kr^+ + e_s + e_s$
10. $e_s + F_2 \rightarrow F^- + F$
11. $e_s + NF_3 \rightarrow F^- + NF_2$
12. $Ar^* + NF_3 \rightarrow ArF^* + NF_2$
13. $Kr^* + NF_3 \rightarrow KrF^* + NF_2$

Table of Equations

For a stable electric field,

A. $2n^* k_i^* < n_F K_{\bar{F}}$ (approx.), so

B. $\dfrac{2n^* k_i^*}{n_F k_{\bar{F}}} < 1$ (approx.)

For electron conservation,

C. $nk_i \simeq n_s n_F k_{\bar{F}}$, so

D. $n_s \simeq \dfrac{nk_i}{n_F k_{\bar{F}}}$

For metastable conservation,

E. $n_s n k^* \simeq n^* n_F k_Q$, so

F. $n^* \simeq \dfrac{n_s n k^*}{n_F k_Q}$

Substituting $n_s$ of (D) into (F),

G. $n^* \simeq \dfrac{nk_i}{n_F k_{\bar{F}}} \cdot \dfrac{nk^*}{n_F k_Q} \simeq \dfrac{n^2 k_i k^*}{n_F^2 k_{\bar{F}} k_Q}$ Substituting n* of (G) into (B), for a stable electric discharge H. $\dfrac{2n^2 k_i k^* k_i^*}{n_F^3 k_Q (k_{\bar{F}})^2} < 1$ With $k_{\bar{N}} > k_{\bar{F}}$ and $k_Q^N < k_n$, I. $2n^* k_i^* < n_N k_{\bar{N}}$ (approx.), so

Table of Equations

J. $\dfrac{2n^* k_i^*}{n_N k_{\bar{N}}} < 1$ (approx.) and

K. $nk_i \simeq n_s n_N k_{\bar{N}}$, so

L. $n_s \simeq \dfrac{nk_i}{n_N k_{\bar{N}}}$

Substituting $n_s$ of (L) into (F)

M. $n^* \simeq \dfrac{nk_i}{n_N k_{\bar{N}}} \cdot \dfrac{nk^*}{n_F k_Q} \simeq \dfrac{n^2 k_i k^*}{n_N n_F k_{\bar{N}} k_Q}$ Substituting n* of (M) into (I), for a stable discharge according to the invention, N. $\dfrac{2n^2 k_i k^* k_i^*}{n_F k_Q (n_N k_{\bar{N}})^2} < 1$ For electron conservation, the production rate of secondary electrons should approximate the rate of consumption of electrons by electron dissociative attachment, as expressed in Equation C, hereinafter. For conservation of rare-gas metastables, the number of metastables produced must approximate the number of metastables which are consumed in providing the lasing species, as set forth in Equation E. In Equation E, the rate of production of metastables is taken to be dependent upon the number of secondary electrons, the number density of all molecules (since the number density of rare-gas molecules is essentially the same, due to the low density of fluorine molecules) times the rate coefficient of metastable production (that is, of processes 3 and 5, hereinafter). Similarly, the bulk process of metastable consumption, on the average across the entire volume of the electric field, is principally dependent upon the production of lasing species (processes 4 and 6, hereinafter) and for proper relationships to ensure a maximally-sustained discharge, is considered not dependent upon the generation of rare-gas ions (processes 8 and 9, hereinafter). Thus, the consumption of metastables is taken as the number density of metastables times the number density of fluorine molecules times the rate coefficient of the production of rare-gas monohalides (processes 4 and 6, hereinafter), as set forth in Equation E. By combining Equations B, D and F, an equality for stable discharge is set forth, approximately, in Equation H. This shows that electric discharge stability bears a cubic dependence upon the number density of the fluorine molecule fuel, and a linear dependence on the ionization rates and metastable production rate in the processes.

Because the fuel molecule ($F_2$ in the example) collisionally deactivates the laser specie molecule (KrF* in the example), and because the fuel molecule ($F_2$) has a high absorption cross section for the wavelength of the laser (about 248 nanometers in the example), the population of the fuel molecule ($F_2$) is critical and must be kept near the optimal concentration (about 0.005 in the example). Therefore, the discharge instability cannot be reduced by increasing the fuel molecule ($F_2$) population.

The cubic dependence of electric discharge stability on the number density of the fluorine molecule fuel (in Equation H) is due to the fact that the balance of secondary electrons (Equation A) is dependent on the number density of the fluorine fuel molecule, which in turn is as a consequence of the electron conservation (Equation C) being dependent upon the number density of the fluorine molecules, and because the metastable conservation is dependent upon the fluorine molecules. However, in accordance with the present invention, adding a small amount of nitrogen fluoride, on the order of one-tenth (i.e., between 0.05 and 0.20) of the amount of fluorine fuel (e.g., 0.0005 in the example), will alter the halogen kinetics so that the loss of the fluorine fuel molecule has a much less severe effect on the occurrence of instability, while exerting little or no influence on the other processes involved. This is due to the fact that the rate coefficient for electron dissociative attachment in nitrogen trifluoride ($k_N^-$, Process 11, hereinafter) is approximately four times larger than the rate coefficient for electron dissociative attachment in fluorine ($k_F^-$, Process 10, hereinafter); and, fortunately, the rate coefficient for rare-gas metastable quenching by nitrogen trifluoride ($k_Q^N$) is about six times smaller than that by the fluorine fuel molecule. Thus, analysis, to an approximation, of the reactions in a laser involving a mixture including small amounts of nitrogen trifluoride, in accordance with the invention, causes the electric field stability to be approximately dependent upon the rate of ionization of metastables being less than the rate of electron dissociative attachment to the nitrogen trifluoride atoms instead of to the fluorine atoms. Thus, Equation A hereinbefore is supplanted by Equation I. Similarly, electron conservation is no longer dependent upon the number density of fluorine molecules ($n_F$) and the rate coefficient of electron dissociative attachment in fluorine molecules ($k_F^-$) as set forth in Equation C, but rather becomes dependent upon the number density of nitrogen trifluoride molecules ($n_N$) and the rate coefficient of electron dissociative attachment in nitrogen trifluoride ($k_N^-$), as set forth in Equation K. Then, substituting Equations J and L, the overall stability equation (Equation N) shows that stability is no longer dependent upon the cube of the number density of fluorine molecules, but rather the first power thereof, and is additionally dependent upon the square of the number density of the nitrogen trifluoride atoms.

Whereas the consumption of fluorine atoms is principally dependent upon the rate coefficient of metastable quenching (that is, the forming of the lasing species, Processes 4 and 6, hereinafter), and because the rate coefficient ($k_Q^N$) for the quenching of metastables with nitrogen trifluoride (processes 12 and 13, hereinafter) is very small, the availability of sufficient nitrogen trifluoride atoms to maintain an adequate electron dissociative attachment the laser pulse. Stated alternatively, the invention decouples the electron consumption due to electron dissociative attachment from the production of laser species by assigning these tasks to different halogen-containing molecules. An example of the improvement of the invention is illustrated in Brown, R. T. and Nighan, W. L. "Stability Enhancement in Electron-Beam-Sustained Excimer Laser Discharges", Applied Physics Letters 35(2), July 1979, pp. 142–144.

The invention is described in terms of an Ar-Kr-$F_2$-$NF_3$ laser. However, improvement of the present invention, which is provided by a trace of $NF_3$, may also be employed in other, similar halide lasers.

In lasers which may employ the present invention, other types of electron guns and electric field high voltage systems may be used, with or without magnetic fields of a static or tailored nature. The invention may be practiced in systems which employ tailoring of the electron beam current density or the electric field, as in our aforementioned copending application, or without such expedients.

Similarly, although the invention has been shown and described with respect to exemplary embodiments thereof, it should be understood by those skilled in the art that the foregoing and various other changes, additions and omissions may be made therein and thereto without departing from the spirit and the scope of the invention.

We claim:
1. An improved rare-gas monofluoride pulse laser, pumped by an electron beam sustained electric discharge, including:
a laser chamber containing a mixture of a rare-gas buffer gas, a rare-gas energy transfer gas, and a fluorine fuel gas, and providing a laser gain region;
electron beam sustained electric discharge means including a high voltage source connected between an anode and a cathode disposed to provide an electric field in said laser gain region and a pulsed electron gun for injecting high energy primary electrons into said laser gain region;
wherein the improvement for delaying the onset of instability of the electric discharge comprises a fractional concentration, on the order of one-tenth of the fractional concentration of fluorine fuel gas, of nitrogen trifluoride in said mixture, whereby said laser chamber contains both said fluorine fuel gas and said nitrogen trifluoride.

* * * * *

UNITED STATES PATENT AND TRADEMARK OFFICE
CERTIFICATE OF CORRECTION

PATENT NO. : 4,348,647
DATED : September 7, 1982
INVENTOR(S) : William L. Nighan, Robert T. Brown It is certified that error appears in the above-identified patent and that said Letters Patent is hereby corrected as shown below:

Column 6, line 42    "conversion" should read --conservation--

Column 10, line 2    after "attachment" insert --rate is assured throughout the temporal expanse of--

Signed and Sealed this

Tenth Day of May 1983

[SEAL]

Attest:

GERALD J. MOSSINGHOFF

Attesting Officer    Commissioner of Patents and Trademarks